(12) United States Patent
Araújo et al.

(10) Patent No.: US 11,308,922 B2
(45) Date of Patent: *Apr. 19, 2022

(54) PORTABLE ELECTRONIC DEVICE FOR MIXED REALITY HEADSET

(71) Applicant: Telefonaktiebolaget LM Ericsson (publ), Stockholm (SE)

(72) Inventors: José Araújo, Stockholm (SE); Lars Andersson, Solna (SE); Diego Gonzalez Morin, Solna (SE); Ioannis Karagiannis, Stockholm (SE); AmirHossein Taher Kouhestani, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 425 days.

This patent is subject to a terminal disclaimer.

(21) Appl. No.: 16/347,943

(22) PCT Filed: Jul. 3, 2018

(86) PCT No.: PCT/EP2018/067933
§ 371 (c)(1),
(2) Date: May 7, 2019

(87) PCT Pub. No.: WO2020/007452
PCT Pub. Date: Jan. 9, 2020

(65) Prior Publication Data
US 2021/0304709 A1    Sep. 30, 2021

(51) Int. Cl.
*G09G 5/38* (2006.01)
*G09G 5/02* (2006.01)
(Continued)

(52) U.S. Cl.
CPC .......... *G09G 5/38* (2013.01); *G02B 27/0172* (2013.01); *G02B 27/0179* (2013.01); *G09G 5/02* (2013.01);
(Continued)

(58) Field of Classification Search
CPC .......... G09G 5/02; G09G 2320/0666; G09G 2320/066; G09G 2320/0686;
(Continued)

(56) References Cited

U.S. PATENT DOCUMENTS

2002/0057361 A1* 5/2002 Mayer, III .......... G03B 21/005
348/383
2010/0321305 A1* 12/2010 Chang .................. G06F 3/0446
345/173
(Continued)

OTHER PUBLICATIONS

International Search Report and Written Opinion of the International Searching Authority, PCTIEP2018/067933, dated Oct. 2, 2018, 15 pages.

*Primary Examiner* — Grace Q Li
(74) *Attorney, Agent, or Firm* — Sage Patent Group

(57) ABSTRACT

A portable electronic device is used with a mixed reality headset. The MR headset includes a lens and a holder that retains the portable electronic device in a defined orientation relative to the lens. The portable electronic device includes a camera, a display device, and a processor. The camera outputs video frames and is arranged to view the lens. The display device is arranged to display information that is projected on the lens for reflection directly or indirectly toward the user's eyes and the camera. The processor performs operations that include processing the video frames from the camera to identify locations of at least one real-world feature, displaying information on the display device, and controlling at least one of the processing of the video frames and the displaying of the information on the
(Continued)

display device to at least partially reduce occurrence in the video frames of the displayed information.

30 Claims, 7 Drawing Sheets

(51) Int. Cl.
*G09G 5/10* (2006.01)
*G02B 27/01* (2006.01)
(52) U.S. Cl.
CPC ......... *G09G 5/10* (2013.01); *G02B 2027/014* (2013.01); *G02B 2027/0118* (2013.01); *G02B 2027/0138* (2013.01); *G02B 2027/0187* (2013.01); *G09G 2320/066* (2013.01); *G09G 2320/0666* (2013.01); *G09G 2320/0686* (2013.01); *G09G 2320/0693* (2013.01); *G09G 2354/00* (2013.01)

(58) Field of Classification Search
CPC ....... G09G 2354/00; G09G 2320/0693; G02B 2027/0118; G02B 2027/014
See application file for complete search history.

(56) References Cited

U.S. PATENT DOCUMENTS

| | | | |
|---|---|---|---|
| 2011/0145879 A1* | 6/2011 | Rajamani | G06F 3/1454 |
| | | | 725/116 |
| 2014/0316192 A1* | 10/2014 | de Zambotti | A61B 5/0205 |
| | | | 600/28 |
| 2015/0260993 A1 | 9/2015 | Bickerstaff et al. | |
| 2016/0232717 A1 | 8/2016 | Wong et al. | |
| 2016/0349509 A1 | 12/2016 | Lanier et al. | |
| 2018/0177446 A1* | 6/2018 | Okabe | A61B 3/113 |
| 2018/0204362 A1* | 7/2018 | Tinsman | G06T 19/006 |
| 2018/0253601 A1* | 9/2018 | Koo | H04W 4/027 |
| 2020/0200794 A1* | 6/2020 | Niles | G01R 13/0218 |
| 2021/0109366 A1* | 4/2021 | Kimura | G09F 9/00 |

* cited by examiner

```
┌─────────────────────────────────────────────────┐
│ Process the video frames from the camera to     │
│ identify a region of the display device that    │──── 900
│ displays a portion of information which occurs  │
│ in the video frames at least partially          │
│ overlapping a location of the real-world feature│
└─────────────────────────────────────────────────┘
                          │
                          ▼
┌─────────────────────────────────────────────────┐
│ Repetitively alternate between displaying the   │
│ portion of the information within the region of │──── 902
│ the display device and ceasing display of the   │
│ portion of the information within the region    │
│ of the display device                           │
└─────────────────────────────────────────────────┘
```

*FIG. 9*

```
┌─────────────────────────────────────────────────┐
│ Process the video frames from the camera to     │──── 1000
│ identify a region of the video frames that      │
│ contains the information                        │
└─────────────────────────────────────────────────┘
                          │
                          ▼
┌─────────────────────────────────────────────────┐
│ Process the region of the video frames          │
│ identified as containing the information at a   │
│ lower frequency than another region of the      │──── 1002
│ video frames that does not contain the          │
│ information, to identify the locations of the   │
│ real-world feature                              │
└─────────────────────────────────────────────────┘
```

*FIG. 10*

```
┌─────────────────────────────────────────────────┐
│ Process the video frames from the camera to     │
│ identify a region of the display device that    │──── 1100
│ displays a portion of information which at      │
│ least partially overlaps a location of the      │
│ real-world feature in the video frames          │
└─────────────────────────────────────────────────┘
                          │
                          ▼
┌─────────────────────────────────────────────────┐
│ Perform at least one of: decreasing brightness  │
│ of the region of the display device; decreasing │
│ contrast of the region of the display device;   │
│ and determining a primary color of the          │──── 1102
│ real-world feature and selecting a color of the │
│ information that is displayed in the region of  │
│ the display device to differentiate from the    │
│ primary color of the real-world feature         │
└─────────────────────────────────────────────────┘
```

*FIG. 11*

PORTABLE ELECTRONIC DEVICE FOR MIXED REALITY HEADSET

CROSS REFERENCE TO RELATED APPLICATIONS

This application is a 35 U.S.C. § 371 national stage application of PCT International Application No. PCT/EP2018/067933 filed on Jul. 3, 2018, the disclosure and content of which is incorporated by reference herein in its entirety.

TECHNICAL FIELD

The present disclosure relates to a portable electronic device for a mixed reality (MR) headset, a method by a portable electronic device for an MR headset, and a corresponding computer program product.

BACKGROUND

Mixed Reality (MR) headsets will be an increasing part of future device ecosystem used by society for interpersonal communication, gaming and other applications. MR headsets augment what a user sees in the real world with computer generated information (e.g., graphical objects, text, indicia, etc.) having a pose that can make the information appear to the user as if it exists in the real world. MR headsets can enable a user to interact in a seemingly real or physical way using special electronic equipment, such as a haptic device that tracks movement of the user and which may provide haptic feedback to the user.

Smartphone or other portable electronic device-based MR headsets are becoming increasing popular, with several startups launching new devices in 2017 and 2018 called Mira Prism, Holokit, Ghost AR, Lenovo Mirage AR. These headsets are relatively inexpensive and can be used with smartphones by Apple, Samsung, Google, and others. For example, developers for the Ghost and Holokit devices can utilize Google's and Apple's MR software development kit (SDK) tools, called ARCore and ARKit, respectively, to perform object recognition and 6 degree-of-freedom (DOF) localization.

MR headsets can generally be characterized into two categories, a mirror-less headset (e.g. Mira Prism type headset depicted in FIGS. 1 and 2 below) and a mirror-based headset (e.g. Holokit and Ghost headsets depicted in FIG. 3). For a mirror-less headset, light emitted by a display device of a portable electronic device 120 (e.g., smartphone) is projected toward a lens 110 (e.g., along path 200a). The lens 100 is at least partially transparent (i.e., see-through) to allow ambient light to pass through for viewing by a user who is wearing the MR headset while also being configured to reflect at least part of the light that is emitted by the display device backward for viewing by the user. The lens 110 may or may not have light concentrating or light dispersing effects (e.g., magnifying light from real-world features). In FIGS. 1 and 2, the lens 110 reflects the light toward the user's eyes (e.g., along path 200b, predominantly by virtue of specular reflection) and toward a camera 122 of the device 120 (e.g., along path 200c, by virtue of diffusive reflection). In contrast, for a mirror-based headset (illustrated in FIG. 3), the light emitted by the display device of the portable electronic device 120 is projected (e.g., along path 330a) toward a mirror 320 which reflects light toward a reflective see-through lens 310 (e.g., along path 330b) for reflection which can be directly or indirectly toward a user's eyes (e.g., along path 330c, predominantly by virtue of specular reflection).

Some mirror-based headsets configure a rear facing (back) camera of the portable electronic device 120 to have a field-of-view of the world, which is beneficial because the rear camera can be configured to provide better quality video than a front camera. For example, current versions of the ARCore or ARKit SDKs can only operate effectively using the rear camera due to its higher quality imaging relative to the front camera. Some mirror-based headsets enable more flexible positioning of the portable electronic device than can be allowed for mirror-less headsets due constrains of the relative positioning between the see-through lens of the headset and the display device of the portable electronic device.

An MR system can operate by having a display device of the portable electronic device project information and other virtual content toward the headset lens (mirror-less design) or the headset mirror (mirror-based design). Video frames from the camera are processed to identify real-world features, such as tracking markers or other real-world objects, which can be used for positioning (e.g. to interrelate real-world and virtual-world (i.e., MR headset reference) coordinate systems), feature recognition, and/or for streaming video to a remote viewer (e.g. for learning/teaching MR applications enabling a remote expert to view video captured by the technician's MR headset and provide responsive guidance).

Because the headset lens or mirror serves two purposes, for reflecting information projected by display toward the user's eyes and for enabling the user to view the real-world therethrough, the projected information may interfere with the user's ability to view the real-world.

SUMMARY

Some embodiments disclosed herein are directed to a portable electronic device for use with a mixed reality (MR) headset. The MR headset includes a lens through which a user wearing the MR headset can view real-world features. The MR headset also includes a holder that is configured to releasably retain the portable electronic device in a defined orientation relative to the lens. The portable electronic device includes a camera, a display device, and a processor. The camera is configured to output video frames and arranged by the holder to view at least a portion of the lens of the MR headset. The display device is arranged to display information that is projected on the lens for reflection directly or indirectly toward the user's eyes and the camera of the MR headset. The processor is operationally connected to the camera and to the display device, and configured to perform operations. The operations include processing the video frames from the camera to identify locations of at least one real-world feature, displaying information at locations on the display device, and controlling at least one of the processing of the video frames and the displaying of the information on the display device to at least partially reduce occurrence in the video frames of the information that is displayed by the display device.

Some potential advantages of these operations include that the information which is projected by the display device onto the lens is controlled to occur less often, if at all, in the video frames. The video frames can thereby more accurately capture images of the real-world and, thereby, enable more robust identification of where the real-world features are present within the video frames and, therefrom, where the real-world features are located relative to the MR headset.

In some further embodiments, the processor controls a frequency at which the display devices repetitively refresh displayed information and/or a frequency which the video frames from the camera are processed to identify locations of the real-world feature, based on whether a display prioritization rule is satisfied or whether a camera video prioritization rule is satisfied. Alternatively or additionally, the processor may operate to repetitively alternate between displaying the information on the display device and ceasing display of the information on the display device, where the processing of the video frames is controlled to occur during first time durations while the information is not displayed on the display device and controlled to not occur during second time durations while the information is displayed on the display device. These operations may further improve the quality at which information is displayed on the display device and/or improve image quality of the video frames from the camera.

Some other embodiments are directed to a corresponding method by a portable electronic device for use with an MR headset. The MR headset has a lens through which a user who is wearing the MR headset can view real-world features. The MR headset also includes a holder that is configured to releasably retain the portable electronic device in a defined orientation relative to the lens. A display device of the portable electronic device is arranged to display information that is projected on the lens for reflection directly or indirectly toward the user's eyes and a camera of the portable electronic device. The method includes processing the video frames from the camera of the portable electronic device to identify locations of at least one real-world feature, displaying information at locations on the display device of the portable electronic device, and controlling at least one of the processing of the video frames and the displaying of the information on the display device to at least partially reduce occurrence in the video frames of the information that is displayed by the display device.

Still some other embodiments are directed to a corresponding computer program product for a portable electronic device that is used with an MR headset having a lens and a holder for the portable electronic device. A display device of the portable electronic device is arranged to display information that is projected on the lens for reflection directly or indirectly toward the user's eyes and a camera of the portable electronic device. The computer program product includes a non-transitory computer readable medium that stores program code which is executable by a processor of the portable electronic device to perform operations. The operations include processing the video frames from the camera of the portable electronic device to identify locations of at least one real-world feature, displaying information at locations on the display device of the portable electronic device, and controlling at least one of the processing of the video frames and the displaying of the information on the display device to at least partially reduce occurrence in the video frames of the information that is displayed by the display device.

Other portable electronic devices and corresponding methods and computer program products according to embodiments will be or become apparent to one with skill in the art upon review of the following drawings and detailed description. It is intended that all such additional portable electronic devices, methods, and computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIGS. 4-12 are flowcharts of operations that can be performed by a portable electronic device to operate in accordance with some embodiments of the present disclosure.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Figure 1:
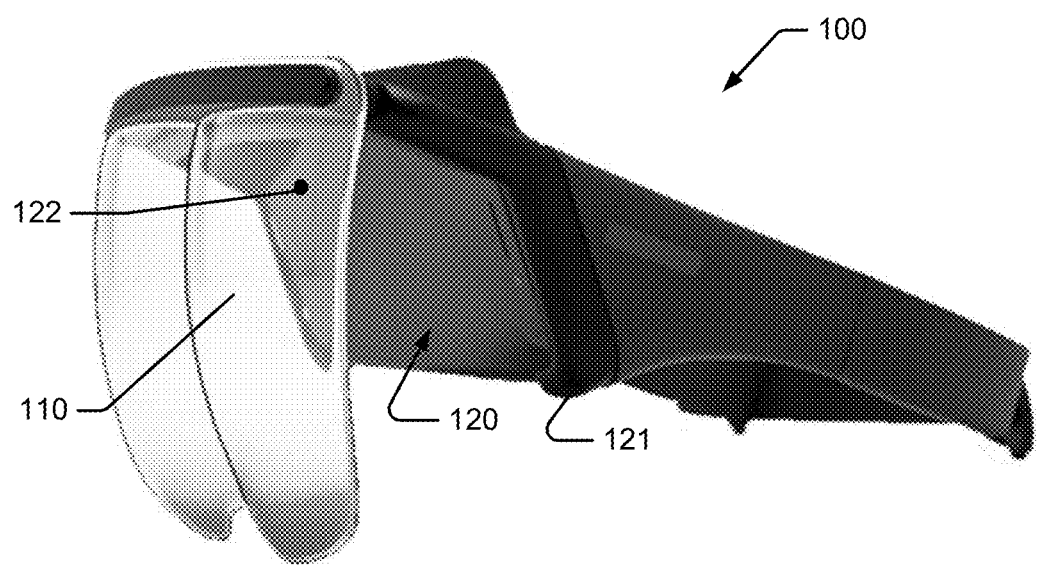
FIG. 1 illustrates a mixed-reality (MR) system that includes an MR headset that holds a portable electronic device which is configured to operate in accordance with some embodiments of the present disclosure.

FIG. 1 illustrates an MR system that includes an MR headset 100 that holds a portable electronic device 120 which is configured to operate in accordance with some embodiments of the present disclosure. Referring to FIG. 1, the MR headset 100 includes a lens 110 through which a user who is wearing the MR headset can view real-world features and further includes a holder 121 that is configured to releasably retain the portable electronic device 120 in a defined orientation relative to the lens 110.

Figure 13:
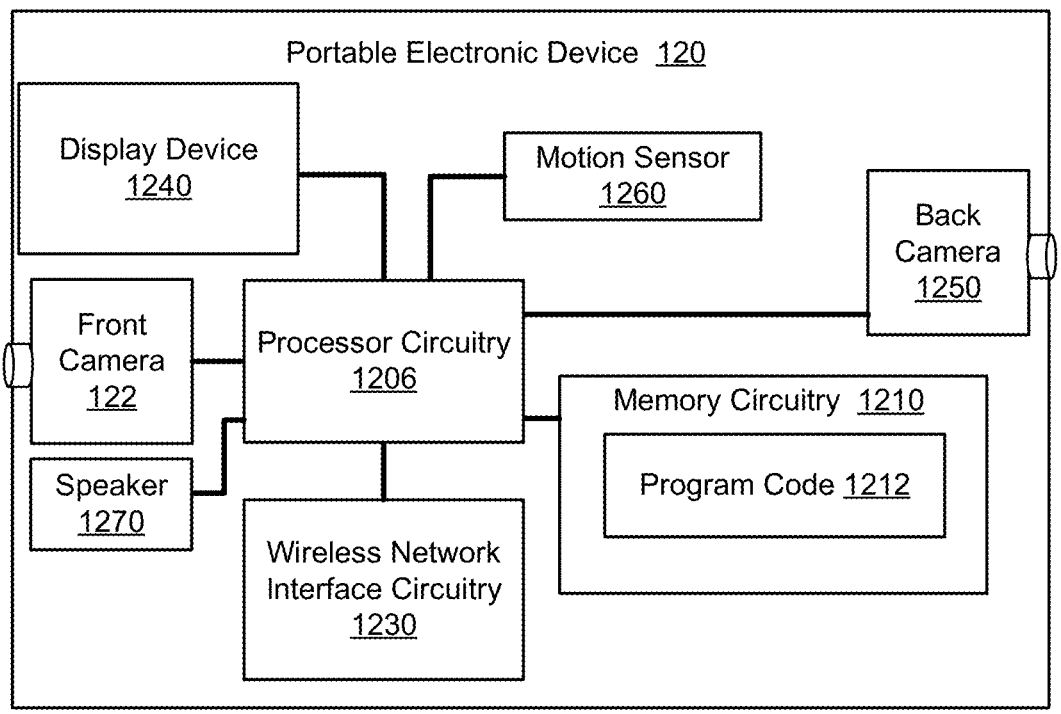
FIG. 13 is a block diagram of components of a portable electronic device that are configured to operate in accordance with some other embodiments of the present disclosure.

The portable electronic device 120 includes a camera 122, a display device (1240 in FIG. 13), and a processor (1206 in FIG. 13). The camera 122 is configured to output video frames and arranged by the holder 121 to view at least a portion of the lens 110 of the MR headset 100. The display device 1240 is arranged to display information that is projected on the lens 110 for reflection directly or indirectly toward the user's eyes, i.e., while wearing the MR headset 100, and the camera 122 of the portable electronic device 120. Although not shown, intervening mirrors may be positioned between the lens 110 and the user's eyes and/or the camera 122 and, hence the light may be reflected directly or indirectly toward the user's eyes and/or the camera 122. The portable electronic device 120 can include, but is not limited to, a smartphone, a palmtop computer, a tablet computer, or other computing device. As will be explained in further detail below, various operations that are described below as being performed by the portable electronic device 120 may additionally or alternatively be performed by another electronic device that is communicatively connected to the portable electronic device 120.

Figure 2:
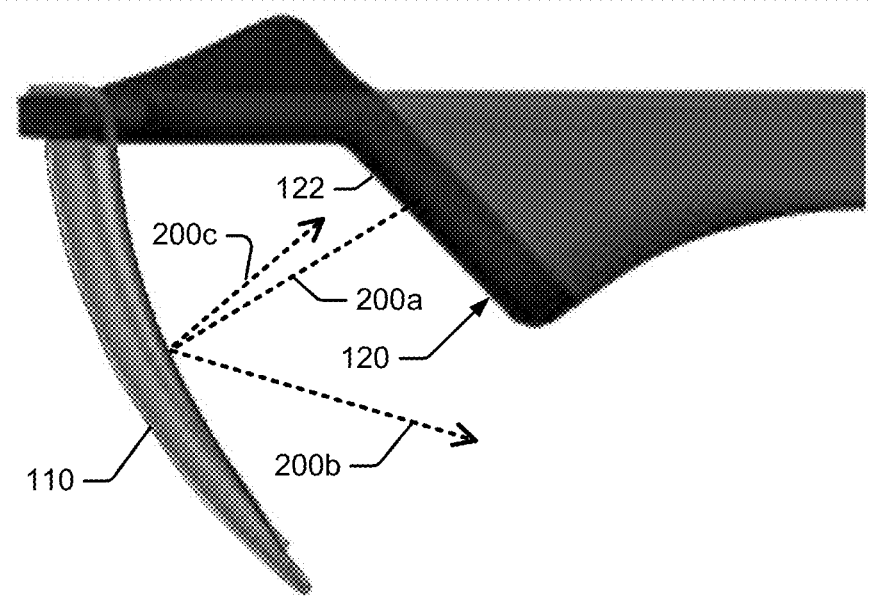
FIG. 2 illustrates a side view of the MR system of FIG. 1.

FIG. 2 illustrates a side view of the MR system of FIG. 1. Referring to FIG. 2, the display device 1240 of the portable electronic device 120 displays information that is projected along path 200a onto the lens 110 for reflection backward along path 200b toward the user's eyes and along path 200c toward the camera 122.

FIGS. 4-12 are flowcharts of operations that can be performed by a portable electronic device in accordance with some embodiments of the present disclosure.

Figure 4:
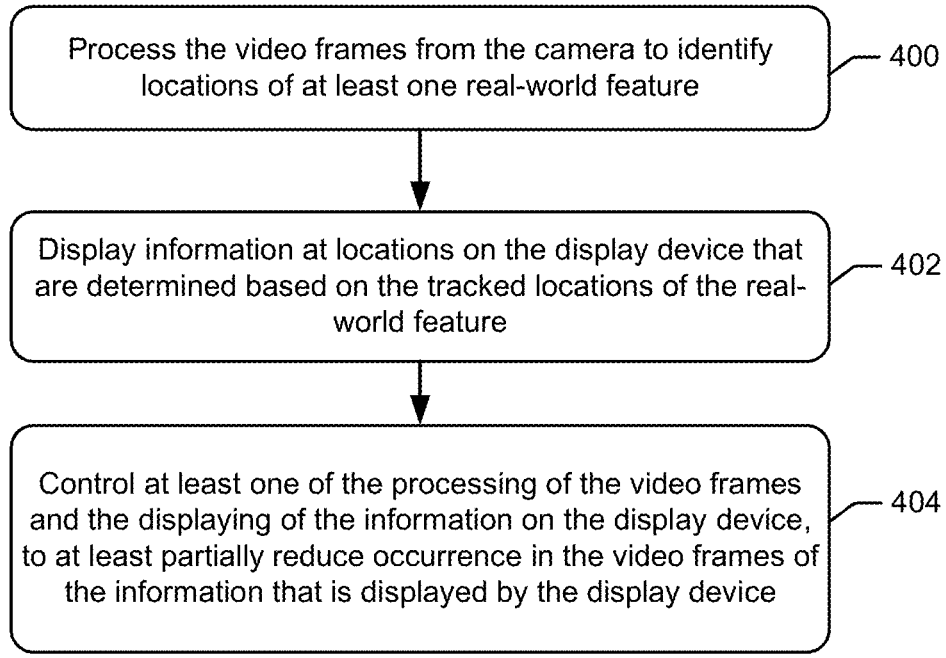

Referring to FIGS. 2 and 4, the processor 1206 is operationally connected to the camera 122 and to the display device 1240. The processor 1206 performs operations that include processing 400 the video frames from the camera 122 to identify locations of at least one real-world feature. The processor 1206 also displays 402 information at locations on the display device 1240. As used herein, the term "information" may be graphical objects, text, indicia, etc. that is displayed on the display device 1240.

If various operational embodiments that are disclosed herein were not used by the portable electronic device 120, the video frames output by the camera 122 would contain the information that is displayed by the display device 1240 for the purpose of being viewed by the user. The displayed information could appear in the video frames overlapping images of the real-world, and may thereby obscure at least part of various real-world features that the portable electronic device 120 is attempting to identify within the images of the video frames. An undesirable consequence is that the portable electronic device 120 may operate less accurately or be prevented from operating to identify real-world features in the video frames.

However, these problems may be reduced or overcome by various embodiments disclosed herein. In accordance with some embodiments, the processor 1206 controls 404 at least one of the processing of the video frames and the displaying of the information on the display device 1240 to at least partially reduce occurrence in the video frames of the information that is displayed by the display device 1240, which may be reflected by the lens 110 toward the camera 122. The description herein of the processor 1206 of the portable electronic device 120 being configured to control "at least one of" the two recited operations is to be understood to mean that the processor 1206 may be configured to control processing of the video frames without being configured to control the displaying of the information on the display device 1240 in order to at least partially reduce occurrence in the video frames of the displayed information, alternatively the processor 1206 may be configured to control the displaying of the information on the display device 1240 without being configured in order to control the processing of the video frames to at least partially reduce occurrence in the video frames of the displayed information, or still alternatively the processor 1206 may be configured to control processing of the video frames and further configured to control the displaying of the information on the display device 1240 in order to at least partially reduce occurrence in the video frames of the displayed information.

Figure 3:
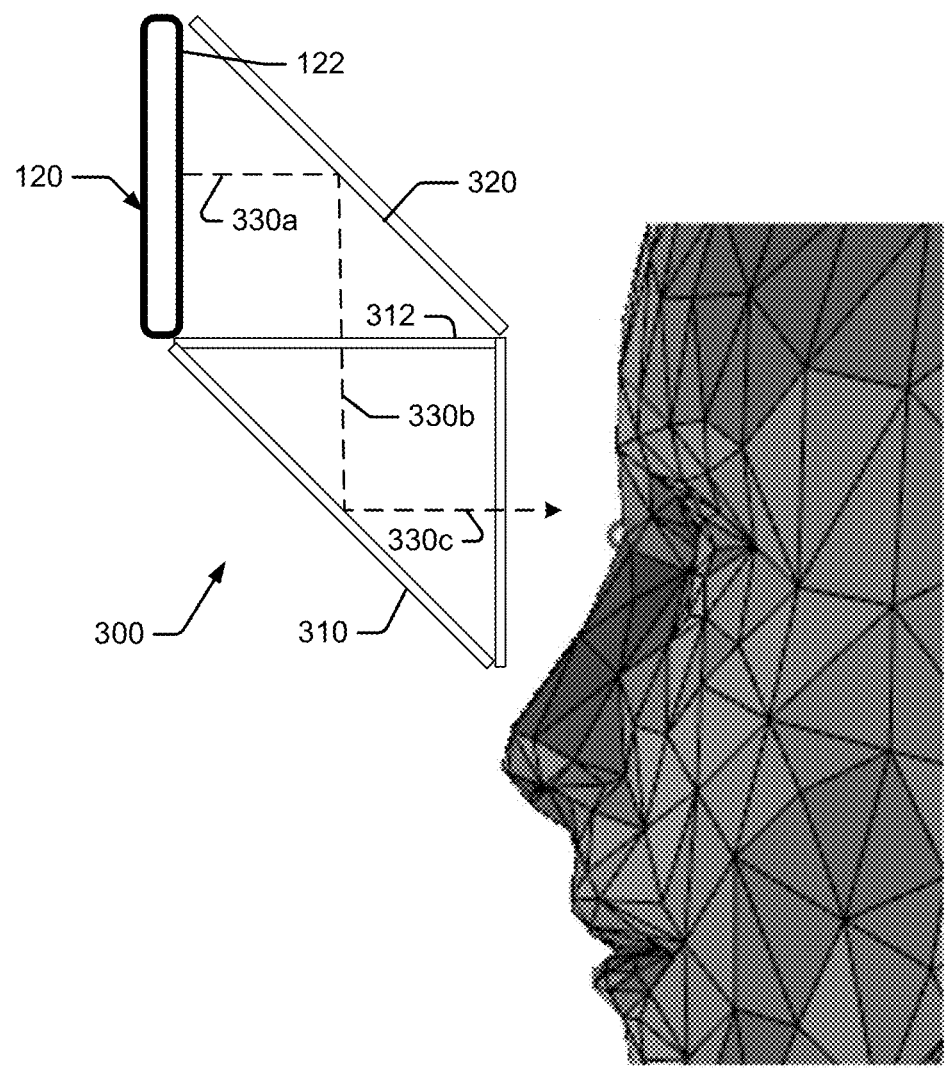
FIG. 3 illustrates another embodiment of a mixed-reality (MR) system with a portable electronic device having a display device that projects images which are reflected directly or indirectly toward a user and toward a camera in accordance with some embodiments of the present disclosure.

Although the operations of FIG. 4 have been described in the context of the mirror-less MR headset 100 of FIGS. 1 and 2, the operations of FIGS. 4-12 may also be performed by portable electronic devices which are used with mirror-based MR headsets. An example mirror-based MR headset 300 is shown in FIG. 3, with the head-worn assembly not shown for simplicity, which may be used with the portable electronic device 120. Referring to FIG. 3, the display device 1240 of the portable electronic device 120 displays information that is projected along path 330a onto the mirror 320 for reflection along path 330d toward the camera 122 and along path 330b toward the lens 310 and, optionally, through an intermediary lens 312. The lens 310 reflects the incident information along path 330c toward the user's eyes, i.e., while the user is wearing the MR headset.

The portable electronic device 120 may perform operations to identify when various rules are satisfied which trigger initiation of the control operations 404 (FIG. 4) to reduce occurrence of the displayed information and the video frames. Various alternative or related operations for triggering the control operations 404 are now explained in the context of the flowcharts of FIGS. 5 and 6.

Figure 5:
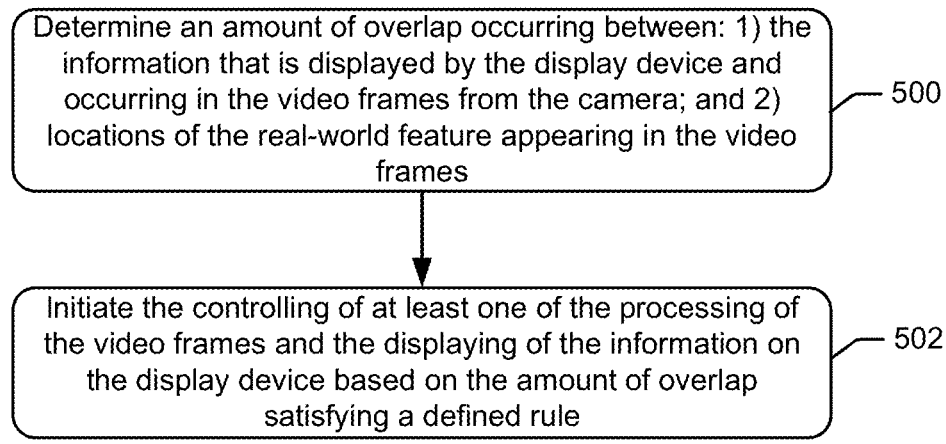

Referring to the operations of FIG. 5, the portable electronic device 120 determines 500 an amount of overlap that is occurring between: 1) the information that is displayed by the display device and which occurs in the video frames from the camera 122; and 2) the locations of the real-world feature that are identified by processing of the video frames from the camera 122. By identifying the overlap between the displayed information and the locations of the real-world feature identified in the video frames, the portable electronic device 120 can determine when, for example, excessive overlap is occurring and responsively initiate the control operations 404 to reduce such overlap. Thus, the portable electronic device 120 can initiate 502 the control operations 404 to control at least one of the processing of the video frames and the displaying of the information on the display device based on the amount of overlap satisfying a defined rule.

Figure 6:
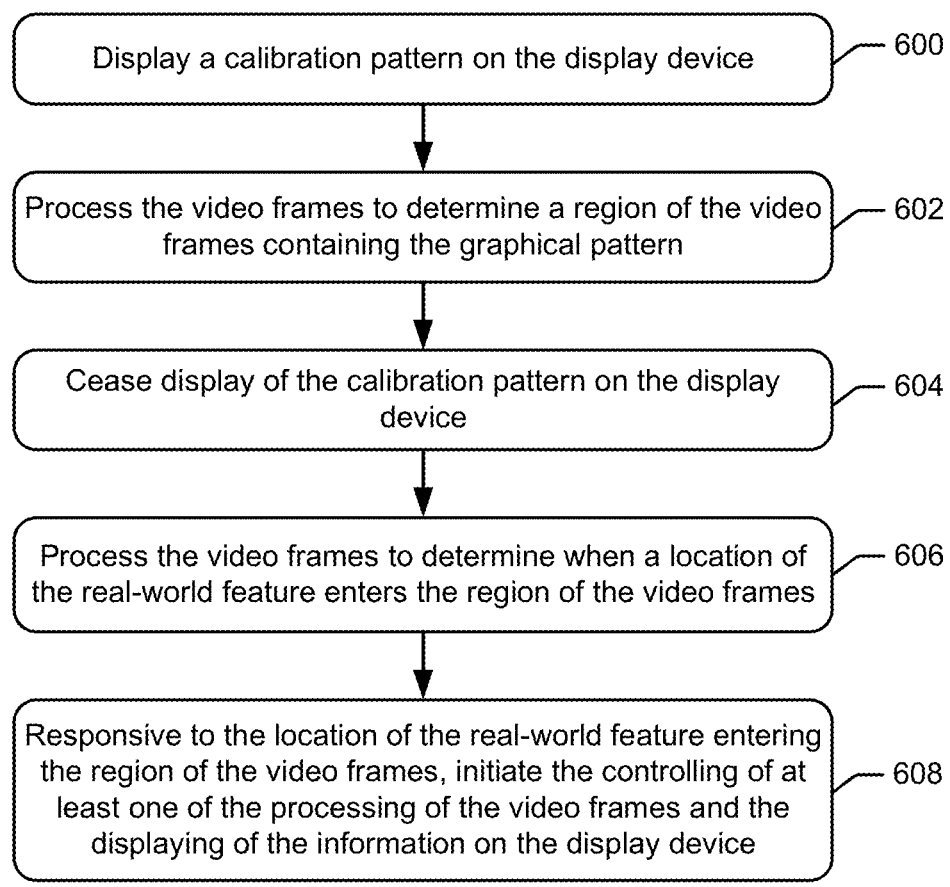

Referring to the alternative or additional operations of FIG. 6, the portable electronic device 120 can display a calibration pattern on the display device, process 602 the video frames to determine a region of the video frames containing the graphical pattern, and then cease 604 displaying of the calibration pattern on the display device. Following cessation of display of the calibration pattern, the portable electronic device 120 processes 606 the video frames to determine when a location of the real-world feature enters the region of the video frames. Responsive to the location of the real-world feature entering the region of the video frames, the portable electronic device 120 initiates 608 the operations to control 404 (FIG. 4) at least one of the processing of the video frames and the displaying of the information on the display device. Thus, the portable electronic device 120 can selectively initiate the control operations 404 when the MR headset is moved in a way that causes a tracked real-world feature to become present in region of the video frames that has been used to display information for viewing by the user. The control operations 404 may thereby be initiated only when needed and, thereby, can avoid possible degradation of the displayed information image quality that is viewed by the user and/or avoid possible interference with operation of the processor's ability to identify locations of the real-world feature in the video frames that may otherwise be obscured by the displayed information.

Figure 7:
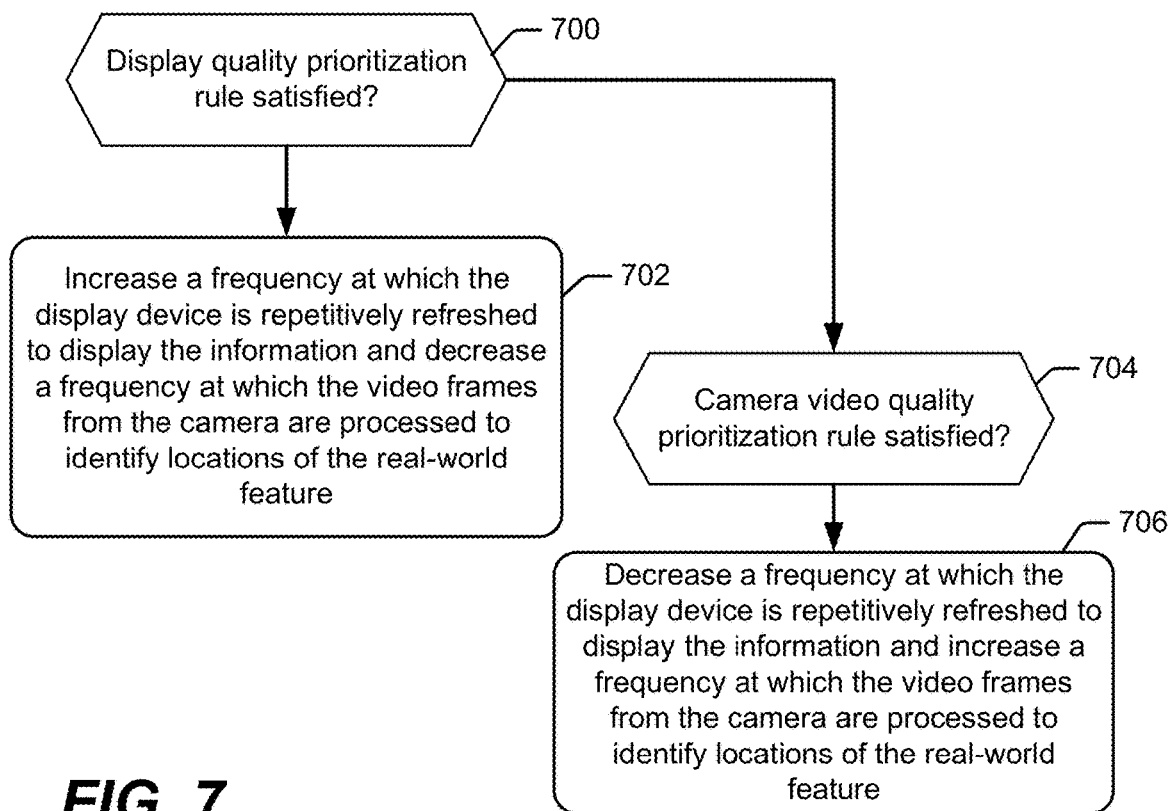
Figure 8:
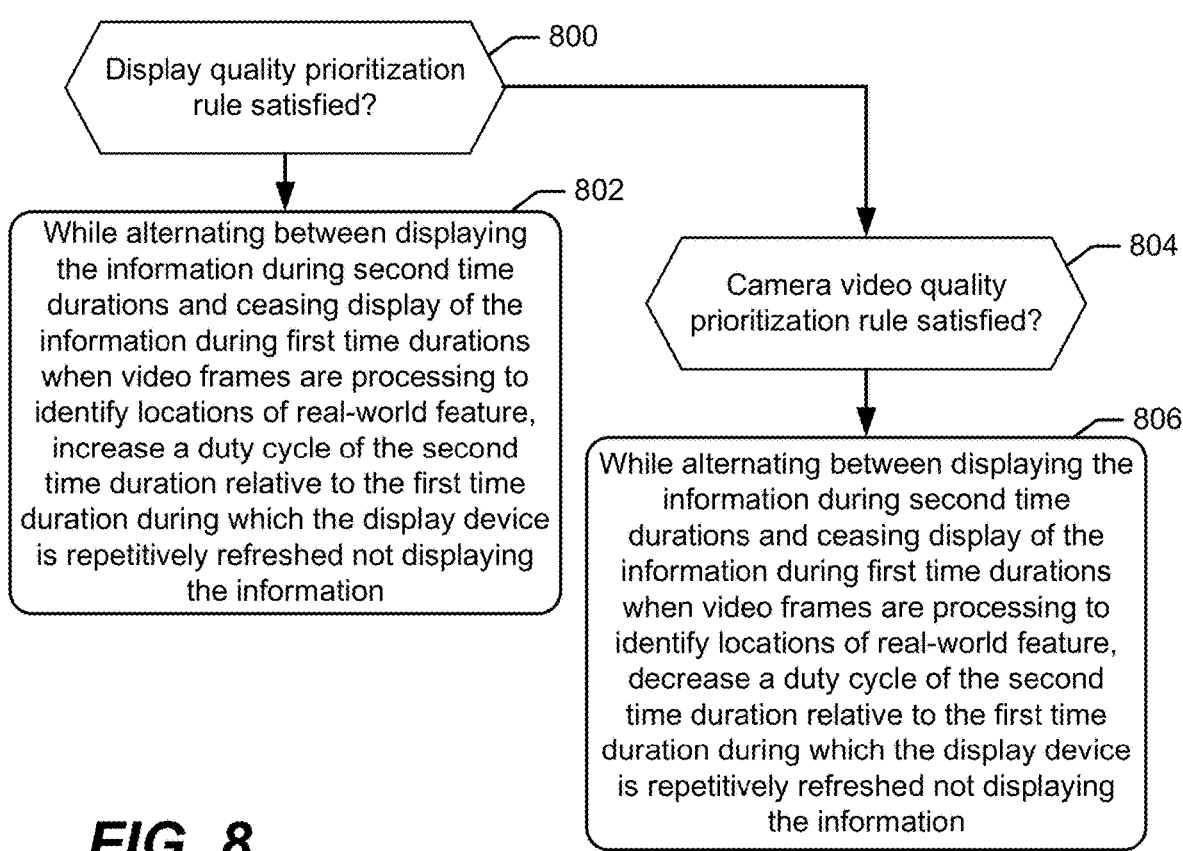

Various operations that can be performed by the portable electronic device 120 to reduce occurrence of the displayed information and the video frames, are now explained in the context of the alternative embodiments of the operational flowcharts of FIGS. 7 and 8.

Referring to operations of FIG. 7, the portable electronic device 120 can operate to determine 700 when a display quality prioritization rule is satisfied. Responsive to the display quality prioritization rule becoming satisfied, the portable electronic device 120 increases 702 a frequency at which the display device is repetitively refreshed to display the information and/or decreases 702 a frequency at which the video frames from the camera are processed to identify locations of the real-world feature. Thus, for example, when the user and/or an application/operating system executed by the portable electronic device 120 activates a mode that prioritizes display quality, the portable electronic device 120 performs operations that can improve the quality of the information that is displayed on the display device and projected on the lens 110 for viewing by the user.

Alternatively or additionally, the portable electronic device 120 can operate to determine 704 when a camera video prioritization rule is satisfied. Responsive to the camera video prioritization rule becoming satisfied, the portable electronic device 120 decreases 706 a frequency at which the display device is repetitively refreshed to display the information and/or increases 706 a frequency at which the video frames from the camera 122 are processed to identify locations of the real-world feature. Thus, for example, when the user and/or an application/operating system executed by the portable electronic device 120 activates a mode that prioritizes camera video quality, the portable electronic device 120 performs operations that can improve the image quality of the video frames from the camera 122 to, for example, facilitate more accurate identification of real-world features and/or provide improved video quality for other use by the portable electronic device 120 and/or another electronic device that is networked thereto.

In some alternative or additional embodiments, the portable electronic device 120 can at least partially reduce occurrence of displayed information in the video frames by controlling the processing the video frames to only occur while the information is not being displayed on the display device. The portable electronic device 120 may operate to repetitively alternate between displaying the information on the display device and ceasing display of the information on the display device, and controlling the processing of the video frames to occur during first time durations while the information is not displayed on the display device and to not occur during second time durations while the information is displayed on the display device.

Referring to the operations illustrated in FIG. 8, the portable electronic device 120 determines 800 when a display quality prioritization rule is satisfied. Responsive to the display quality prioritization rule becoming satisfied, the portable electronic device 120 increases 802 a duty cycle of the second time duration during which the display device is repetitively refreshed to display the information relative to the first time duration during which the display device is repetitively refreshed to not display the information. The portable electronic device 120 may additionally or alternatively determine 804 when a camera video prioritization rule is satisfied. Responsive to the camera video prioritization rule becoming satisfied, portable electronic device 120 decreases 806 a duty cycle of the second time duration during which the display device is repetitively refreshed to display the information relative to the first time duration during which the display device is repetitively refreshed to not display the information.

Thus, for example, when a mode that prioritizes display quality is active the portable electronic device 120 can perform operations that increase the time duration during which information is displayed relative to the time duration during which information is not displayed, which can improve the quality of the information that is displayed on the display device. Alternatively or additionally, when a mode that prioritizes camera video quality is active the portable electronic device 120 can perform operations that decrease the time duration during which information is displayed relative to the time duration during which information is not displayed, which can improve the image quality of the video frames from the camera 122.

Various of the above operations may be performed by the portable electronic device 120 to more selectively control the display of information in a region of the display device that would at least partially overlap a location of the real-world feature that is to be identified by the processor. These operations may thereby avoid affecting how information is displayed in other region(s) of the display device. These and further related operations are now explained in the context of the alternative embodiments of the operational flowcharts of FIGS. 9-12.

Referring to the operations of FIG. 9, the portable electronic device 120 processes 900 the video frames from the camera 122 to identify a region of the display device that displays a portion of information which occurs in the video frames at least partially overlapping a location of the real-world feature. The portable electronic device 120 then repetitively alternates 902 between displaying the portion of the information within the region of the display device and ceasing display of the portion of the information within the region of the display device. The processing of the video frames is controlled to occur during first time durations while the portion of the information is not displayed within the region of the display device and controlled to not occur during second time durations while the portion of the information is displayed within the region of the display device. Thus, operations for alternating between displaying and not displaying the portion of the information affects only the region of the display device that has been identified as at least partially overlapping a location of the real-world feature that is to be identified by the processor.

In a further embodiment, the operations to repetitively alternate 902 between displaying and ceasing display of the portion of the information within the region of the display device, include determining when a display quality prioritization rule is satisfied. Responsive to the rule becoming satisfied, the portable electronic device 120 increases a duty cycle of the second time duration during which the region of the display device is repetitively refreshed to display the portion of the information relative to the second time duration during which the region of the display device is repetitively refreshed not displaying the portion of the information.

In an alternative further embodiment, the operations to repetitively alternate 902 between displaying and ceasing display of the portion of the information within the region of the display device, include determining when a camera video prioritization rule is satisfied and then responsive to it becoming satisfied, decreasing a duty cycle of the second time duration during which the region of the display device is repetitively refreshed to display the portion of the information relative to the second time duration during which the region of the display device is repetitively refreshed not displaying the portion of the information.

The portable electronic device 120 may vary the rate at which two different regions of the video frames are processed to identify real-world features based on one of the regions containing information that is displayed on the display device and other region not containing the information. Referring to the example operations illustrated in FIG. 10, the portable electronic device 120 processes 1000 the video frames from the camera 122 to identify a region of the video frames that contains the information. The portable electronic device 120 then processes 1002 the region of the video frames identified as containing the information at a lower frequency to identify the locations of the real-world feature from another region of the video frames that does not contain the information.

The portable electronic device 120 may control the brightness, contrast, and/or color of information for a portion of the display device that displays information which overlaps a location of the real-world feature it is to be identified by the processor. Referring to the example operations illustrated in FIG. 11, the portable electronic device 120 processes 1100 the video frames from the camera 122 to identify a region of the display device that displays a portion of information and which at least partially overlaps a location of the real-world feature in the video frames. The operations to control (404 of FIG. 4) at least one of the processing of the video frames and the displaying of the information on the display device, includes performing 1102 at least one of: decreasing brightness of the region of the display device; decreasing contrast of the region of the display device; determining a primary color of the real-world feature and selecting a color of the information that is displayed in the region of the display device to differentiate from the primary color of the real-world feature.

Figure 12:
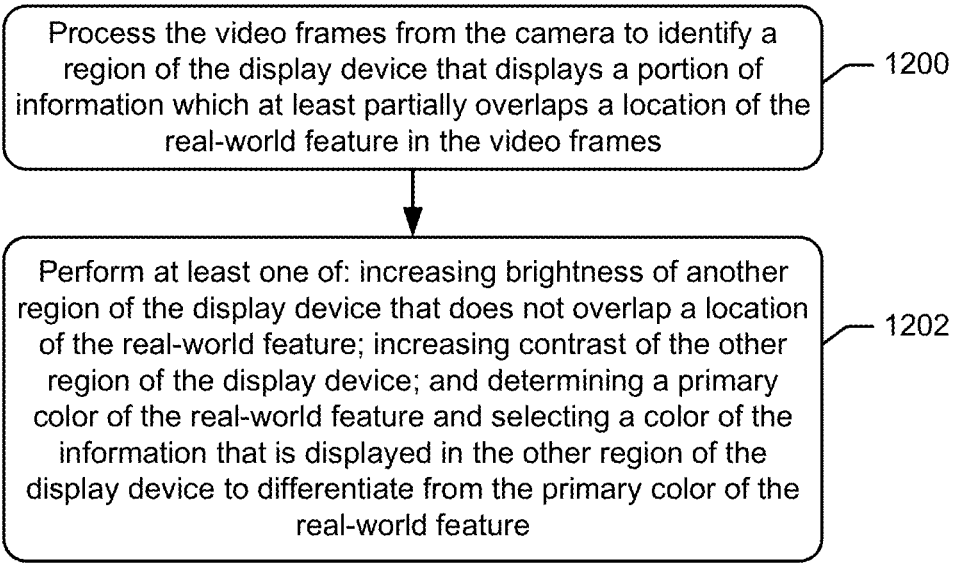

Referring to the example further operations illustrated in FIG. 12, the portable electronic device 120 processes 1200 the video frames from the camera 122 to identify a region of the display device that displays a portion of information and which at least partially overlaps a location of the real-world feature in the video frames. The operations to control (404 of FIG. 4) at least one of the processing of the video frames and the displaying of the information on the display device, includes performing 1202 at least one of: increasing brightness of another region of the display device that does not overlap a location of the real-world feature in the video frames; increasing contrast of the other region of the display device; and determining a primary color of the real-world feature and selecting a color of the information that is displayed in the other region of the display device to differentiate from the primary color of the real-world feature.

The portable electronic device 120 may identify the region based on determining where the user's eyes are presently directed. In one embodiment, the portable electronic device 120 identifies a region of the display device at which the user's eyes are presently directed. The operations to control (404 of FIG. 4) at least one of the processing of the video frames and the displaying of the information on the display device, includes performing at least one of: decreasing brightness of the region of the display device; decreasing contrast of the region of the display device; determining a primary color of the real-world feature and selecting a color of the information that is displayed in the region of the display device to differentiate from the primary color of the real-world feature; increasing brightness of another region of the display device that does not overlap a location of the real-world feature in the video frames; increasing contrast of the other region of the display device; determining a primary color of the real-world feature and selecting a color of the information that is displayed in the other region of the display device to differentiate from the primary color of the real-world feature. The portable electronic device 120 may process the video frames from the camera 122 to identify an orientation of a pupil of one of the user's eyes and, therefrom, identify the region of the display device where the user's eyes are presently directed. In a further embodiment, the portable electronic device 120 may include an infrared emitter that illuminates one or both of the pupils of the user's eyes to enhance their contrast relative to other objects in the camera's field-of-view and, thereby, facilitate identification of their orientation relative to the display device.

Cloud Implementation

Some or all operations described above as being performed by a portable electronic device may alternatively be performed by another node that is part of a network cloud computing resource. For example, those operations can be performed as a network function by a cloud server or a cloud resource of a network operator, such as a gaming or other entertainment server, map travel routing server, eCommerce server, etc.

Example Portable Electronic Device Configurations

FIG. 13 is a block diagram of components of a portable electronic device 120 that are configured to operate in accordance with some other embodiments of the present disclosure. The portable electronic device 120 can include a camera (e.g. a front camera 122 and/or a back camera 1250), a display device 1240, at least one processor circuit 1206 (processor), and at least one memory 1210 (memory). The portable electronic device 120 may further include wireless network interface circuitry 1230, a motion sensor 1260, and/or a speaker 1270. The motion sensor 1260 may include an inertial measurement unit which outputs signals that are processed by the processor 1206 to determine orientation and/or movement of the portable electronic device 120. The wireless network interface circuit 1230 may be configured to communicate with another electronic device through a wireless (e.g., Wi-Fi, Bluetooth, cellular, etc.) network interface.

The processor 1206 is operationally connected to these various components. The memory 1210 stores program code 1212 that is executed by the processor 1206 to perform operations. The processor 1206 may include one or more data processing circuits, such as a general purpose and/or special purpose processor (e.g., microprocessor and/or digital signal processor), which may be collocated or distributed across one or more data networks. The processor 1206 is configured to execute computer program instructions among program code 1212 in the memory 1210, described below as a computer readable medium, to perform some or all of the operations and methods for one or more of the embodiments disclosed herein for a portable electronic device.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A portable electronic device for a mixed reality, MR, headset including a lens through which a user wearing the MR headset can view real-world features and including a holder configured to retain the portable electronic device in a defined orientation relative to the lens, the portable electronic device comprising:
   a camera configured to output video frames and arranged by the holder to view at least a portion of the lens of the MR headset;
   a display device arranged to display information that is projected on the lens for reflection directly or indirectly toward the user's eyes and the camera of the MR headset;
   a processor operationally connected to the camera and to the display device, and configured to perform operations comprising:
      processing the video frames from the camera to identify locations of at least one real-world feature;
      displaying information at locations on the display device; and
      controlling at least one of the processing of the video frames to identify locations of at least one real-world feature and the displaying of the information on the display device, to at least partially reduce occurrence in the video frames of the information that is displayed by the display device, wherein the controlling of the processing of the video frames comprises controlling the processing of the video frames to identify locations of at least one real-world feature to occur during second time durations while the information is not displayed on the display device and further controlling the processing of the video frames to identify locations of at least one real-world feature to not occur during first time durations while the information is displayed on the display device, and wherein the controlling of the displaying of the information on the display device comprises controlling the displaying of the information on the display device during the first time durations to occur while the processing is not performed on the video frames to identify locations of at least one real-world feature and further controlling the ceasing of the displaying of the information on the display device during the second time durations to occur while the processing is being performed on the video frames to identify locations of at least one real-world feature.

2. The portable electronic device of claim 1, wherein the operations further comprise:

determining an amount of overlap occurring between: 1) the information that is displayed by the display device and occurring in the video frames from the camera; and 2) the locations of the real-world feature that are identified by processing of the video frames from the camera; and initiating the controlling of at least one of the processing of the video frames to identify locations of at least one real-world feature to occur during the second time durations and the displaying of the information on the display device to occur during the first time durations, based on the amount of overlap satisfying a defined rule.

3. The portable electronic device of claim 1, wherein the operations further comprise:

displaying a calibration pattern on the display device;

processing the video frames to determine a region of the video frames containing the graphical pattern;

ceasing display of the calibration pattern on the display device;

following cessation of display of the calibration pattern, processing the video frames to determine when a location of the real-world feature enters the region of the video frames; and responsive to the location of the real-world feature entering the region of the video frames, initiating the controlling of at least one of the processing of the video frames to identify locations of at least one real-world feature to occur during the second time durations and the displaying of the information on the display device to occur during the first time durations.

4. The portable electronic device of claim 1, wherein the operations to control at least one of the processing of the video frames and the displaying of the information on the display device, further comprise:

determining when a display quality prioritization rule is satisfied; and responsive to the display quality prioritization rule becoming satisfied, controlling the displaying of the information on the display device to increase a frequency at which the display device is repetitively refreshed to display the information during the first time durations to occur while the processing is not performed on the video frames to identify locations of at least one real-world feature, and/or controlling the processing of the video frames to identify locations of at least one real-world feature to decrease a frequency at which the video frames from the camera are processed to identify locations of the real-world feature during the second time durations while the information is not displayed on the display device.

5. The portable electronic device of claim 1, wherein the operations to control at least one of the processing of the video frames and the displaying of the information on the display device, further comprise:

determining when a camera video prioritization rule is satisfied; and responsive to the camera video prioritization rule becoming satisfied, controlling the displaying of the information on the display device to decrease a frequency at which the display device is repetitively refreshed to display the information during the first time durations to occur while the processing is not performed on the video frames to identify locations of at least one real-world feature, and/or controlling the processing of the video frames to identify locations of at least one real-world feature to increase a frequency at which the video frames from the camera are processed to identify locations of the real-world feature during the second time durations while the information is not displayed on the display device.

6. The portable electronic device of claim 1, wherein the operations to further comprise:

determining when a display quality prioritization rule is satisfied; and responsive to the display quality prioritization rule becoming satisfied, increasing a duty cycle of the second time duration during which the display device is repetitively refreshed to display the information relative to the first time duration during which the display device is repetitively refreshed not displaying the information.

7. The portable electronic device of claim 1, wherein the operations further comprise:

determining when a camera video prioritization rule is satisfied; and responsive to the camera video prioritization rule becoming satisfied, decreasing a duty cycle of the second time duration during which the display device is repetitively refreshed to display the information relative to the first time duration during which the display device is repetitively refreshed not displaying the information.

8. The portable electronic device of claim 1, wherein:

the operations further comprise processing the video frames from the camera to identify a region of the display device that displays a portion of information which occurs in the video frames at least partially overlapping a location of the real-world feature, and the operations to control at least one of the processing of the video frames and the displaying of the information on the display device, further comprise:

repetitively alternating between displaying the portion of the information within the region of the display device and ceasing display of the portion of the information within the region of the display device, wherein the processing of the video frames is controlled to occur during the first time durations while the portion of the information is not displayed within the region of the display device and controlled to not occur during the second time durations while the portion of the information is displayed within the region of the display device.

9. The portable electronic device of claim 8, wherein the operations to repetitively alternate between displaying the portion of the information within the region of the display device and ceasing display of the portion of the information within the region of the display device, further comprise:
  determining when a display quality prioritization rule is satisfied; and
  responsive to the display quality prioritization rule becoming satisfied, increasing a duty cycle of the second time duration during which the region of the display device is repetitively refreshed to display the portion of the information relative to the second time duration during which the region of the display device is repetitively refreshed not displaying the portion of the information.

10. The portable electronic device of claim 8, wherein the operations to repetitively alternate between displaying the portion of the information within the region of the display device and ceasing display of the portion of the information within the region of the display device, further comprise:
  determining when a camera video prioritization rule is satisfied; and
  responsive to the camera video prioritization rule becoming satisfied, decreasing a duty cycle of the second time duration during which the region of the display device is repetitively refreshed to display the portion of the information relative to the second time duration during which the region of the display device is repetitively refreshed not displaying the portion of the information.

11. The portable electronic device of claim 1, wherein:
  the operations further comprise processing the video frames from the camera to identify a region of the video frames that contains the information; and
  the operations to control at least one of the processing of the video frames and the displaying of the information on the display device, further comprise:
    processing the region of the video frames identified as containing the information at a lower frequency to identify locations of at least one real-world feature than another region of the video frames being processed to identify locations of at least one real-world feature that does not contain the information.

12. The portable electronic device of claim 1, wherein:
  the operations further comprise processing the video frames from the camera to identify a region of the display device that displays a portion of information and which at least partially overlaps a location of the real-world feature in the video frames, and
  the operations to control at least one of the processing of the video frames and the displaying of the information on the display device, further comprise:
    performing at least one of: decreasing brightness of the region of the display device; decreasing contrast of the region of the display device; determining a primary color of the real-world feature and selecting a color of the information that is displayed in the region of the display device to differentiate from the primary color of the real-world feature.

13. The portable electronic device of claim 1, wherein:
  the operations further comprise processing the video frames from the camera to identify a region of the display device that displays a portion of information and which at least partially overlaps a location of the real-world feature in the video frames, and
  the operations to control at least one of the processing of the video frames and the displaying of the information on the display device, further comprise:
    performing at least one of: increasing brightness of another region of the display device that does not overlap a location of the real-world feature in the video frames; increasing contrast of the other region of the display device; and determining a primary color of the real-world feature and selecting a color of the information that is displayed in the other region of the display device to differentiate from the primary color of the real-world feature.

14. The portable electronic device of claim 1, wherein:
  the operations further comprise identifying a region of the display device at which the user's eyes are presently directed, and
  the operations to control at least one of the processing of the video frames and the displaying of the information on the display device, further comprise:
    performing at least one of: decreasing brightness of the region of the display device; decreasing contrast of the region of the display device; determining a primary color of the real-world feature and selecting a color of the information that is displayed in the region of the display device to differentiate from the primary color of the real-world feature; increasing brightness of another region of the display device that does not overlap a location of the real-world feature in the video frames; increasing contrast of the other region of the display device; determining a primary color of the real-world feature and selecting a color of the information that is displayed in the other region of the display device to differentiate from the primary color of the real-world feature.

15. A method by a portable electronic device for a mixed reality, MR, headset including a lens through which a user wearing the MR headset can view real-world features and including a holder configured to retain the portable electronic device in a defined orientation relative to the lens, wherein a display device of the portable electronic device is arranged to display information that is projected on the lens for reflection directly or indirectly toward the user's eyes and a camera of the portable electronic device, the method comprising:
  processing the video frames from the camera of the portable electronic device to identify locations of at least one real-world feature;
  displaying information at locations on the display device of the portable electronic device; and
  controlling at least one of the processing of the video frames to identify locations of at least one real-world feature and the displaying of the information on the display device, to at least partially reduce occurrence in the video frames of the information that is displayed by the display device,
  wherein the controlling of the processing of the video frames comprises controlling the processing of the video frames to identify locations of at least one real-world feature to occur during second time durations while the information is not displayed on the display device and further controlling the processing of the video frames to identify locations of at least one real-world feature to not occur during first time durations while the information is displayed on the display device, and wherein the controlling of the displaying of the information on the display device comprises controlling the displaying of the information on the display device during the first time durations to occur while the processing is not performed on the video frames to identify locations of at least one real-world feature and further controlling the ceasing of the displaying of the information on the display device during the second time durations to occur while the processing is being performed on the video frames to identify locations of at least one real-world feature.

16. The method of claim 15, further comprising:
determining an amount of overlap occurring between: 1) the information that is displayed by the display device and occurring in the video frames from the camera; and 2) the locations of the real-world feature that are identified by processing of the video frames from the camera; and
initiating the controlling of at least one of the processing of the video frames to identify locations of at least one real-world feature to occur during the second time durations and the displaying of the information on the display device during the first time durations, based on the amount of overlap satisfying a defined rule.

17. The method of claim 15, further comprising;
displaying a calibration pattern on the display device;
processing the video frames to determine a region of the video frames containing the graphical pattern;
ceasing display of the calibration pattern on the display device;
following cessation of display of the calibration pattern, processing the video frames to determine when a location of the real-world feature enters the region of the video frames; and
responsive to the location of the real-world feature entering the region of the video frames, initiating the controlling of at least one of the processing of the video frames to identify locations of at least one real-world feature to occur during the second time durations and the displaying of the information on the display device.

18. The method of claim 15, wherein controlling at least one of the processing of the video frames and the displaying of the information on the display device, further comprises:
determining when a display quality prioritization rule is satisfied; and
responsive to the display quality prioritization rule becoming satisfied, controlling the displaying of the information on the display device to increase a frequency at which the display device is repetitively refreshed to display the information during the first time durations to occur while the processing is not performed on the video frames to identify locations of at least one real-world feature, and/or controlling the processing of the video frames to identify locations of at least one real-world feature to decrease a frequency at which the video frames from the camera are processed to identify locations of the real-world feature during the second time durations while the information is not displayed on the display device.

19. The method of claim 15, wherein controlling at least one of the processing of the video frames and the displaying of the information on the display device, further comprises:
determining when a camera video prioritization rule is satisfied; and
responsive to the camera video prioritization rule becoming satisfied, controlling the displaying of the information on the display device to decrease a frequency at which the display device is repetitively refreshed to display the information during the first time durations to occur while the processing is not performed on the video frames to identify locations of at least one real-world feature, and/or controlling the processing of the video frames to identify locations of at least one real-world feature to increase a frequency at which the video frames from the camera are processed to identify locations of the real-world feature during the second time durations while the information is not displayed on the display device.

20. The method of claim 15, wherein controlling at least one of the processing of the video frames and the displaying of the information on the display device, further comprises:
repetitively alternating between displaying the information on the display device and ceasing display of the information on the display device, wherein the processing of the video frames is controlled to occur during first time durations while the information is not displayed on the display device and controlled to not occur during second time durations while the information is displayed on the display device.

21. The method of claim 15, further comprising:
determining when a display quality prioritization rule is satisfied; and
responsive to the display quality prioritization rule becoming satisfied, increasing a duty cycle of the second time duration during which the display device is repetitively refreshed to display the information relative to the first time duration during which the display device is repetitively refreshed not displaying the information.

22. The method of claim 15, further comprising:
determining when a camera video prioritization rule is satisfied; and
responsive to the camera video prioritization rule becoming satisfied, decreasing a duty cycle of the second time duration during which the display device is repetitively refreshed to display the information relative to the first time duration during which the display device is repetitively refreshed not displaying the information.

23. The method of claim 15,
further comprising processing the video frames from the camera to identify a region of the display device that displays a portion of information which occurs in the video frames at least partially overlapping a location of the real-world feature, and
wherein controlling at least one of the processing of the video frames and the displaying of the information on the display device, further comprises:
repetitively alternating between displaying the portion of the information within the region of the display device and ceasing display of the portion of the information within the region of the display device, wherein the processing of the video frames is controlled to occur during the first time durations while the portion of the information is not displayed within the region of the display device and controlled to not occur during the second time durations while the portion of the information is displayed within the region of the display device.

24. The method of claim 23, wherein repetitively alternating between displaying the portion of the information within the region of the display device and ceasing display of the portion of the information within the region of the display device, further comprises:

determining when a display quality prioritization rule is satisfied; and responsive to the display quality prioritization rule becoming satisfied, decreasing a duty cycle of the second time duration during which the region of the display device is repetitively refreshed to display the portion of the information relative to the second time duration during which the region of the display device is repetitively refreshed not displaying the portion of the information.

25. The method of claim 23, wherein repetitively alternating between displaying the portion of the information within the region of the display device and ceasing display of the portion of the information within the region of the display device, further comprises:

determining when a camera video prioritization rule is satisfied; and responsive to the camera video prioritization rule becoming satisfied, decreasing a duty cycle of the second time duration during which the region of the display device is repetitively refreshed to display the portion of the information relative to the second time duration during which the region of the display device is repetitively refreshed not displaying the portion of the information.

26. The method of claim 15, further comprising processing the video frames from the camera to identify a region of the video frames that contains the information, and wherein controlling at least one of the processing of the video frames and the displaying of the information on the display device, further comprises:

processing the region of the video frames identified as containing the information at a lower frequency to identify locations of at least one real-world feature than another region of the video frames being processed to identify locations of at least one real-world feature that does not contain the information.

27. The method of claim 15, further comprising processing the video frames from the camera to identify a region of the display device that displays a portion of information which at least partially overlaps a location of the real-world feature in the video frames, and wherein controlling at least one of the processing of the video frames and the displaying of the information on the display device, further comprises:

performing at least one of: decreasing brightness of the region of the display device; decreasing contrast of the region of the display device; and determining a primary color of the real-world feature and selecting a color of the information that is displayed in the region of the display device to differentiate from the primary color of the real-world feature.

28. The method of claim 15, further comprising processing the video frames from the camera to identify a region of the display device that displays a portion of information which at least partially overlaps a location of the real-world feature in the video frames, and wherein controlling at least one of the processing of the video frames and the displaying of the information on the display device, further comprises:

performing at least one of: increasing brightness of another region of the display device that does not overlap a location of the real-world feature in the video frames; increasing contrast of the other region of the display device; determining a primary color of the real-world feature and selecting a color of the information that is displayed in the other region of the display device to differentiate from the primary color of the real-world feature.

29. The method of claim 15:

further comprising identifying a region of the display device at which the user's eyes are presently directed, and wherein controlling at least one of the processing of the video frames and the displaying of the information on the display device, further comprises:

performing at least one of: decreasing brightness of the region of the display device; decreasing contrast of the region of the display device; determining a primary color of the real-world feature and selecting a color of the information that is displayed in the region of the display device to differentiate from the primary color of the real-world feature; increasing brightness of another region of the display device that does not overlap a location of the real-world feature in the video frames; increasing contrast of the other region of the display device; determining a primary color of the real-world feature and selecting a color of the information that is displayed in the other region of the display device to differentiate from the primary color of the real-world feature.

30. A computer program product for a portable electronic device for a mixed reality, MR, headset having a lens through which a user wearing the MR headset can view real-world features, wherein a display device of the portable electronic device is arranged to display information that is projected on the lens for reflection directly or indirectly toward the user's eyes and a camera of the portable electronic device, the computer program product comprising:

a non-transitory computer readable medium storing program code executable by a processor of the portable electronic device to perform operations comprising:

processing the video frames from the camera of the portable electronic device to identify locations of at least one real-world feature;

displaying information at locations on the display device of the portable electronic device; and controlling at least one of the processing of the video frames to identify locations of at least one real-world feature and the displaying of the information on the display device, to at least partially reduce occurrence in the video frames of the information that is displayed by the display device, wherein the controlling of the processing of the video frames comprises controlling the processing of the video frames to identify locations of at least one real-world feature to occur during second time durations while the information is not displayed on the display device and further controlling the processing of the video frames to identify locations of at least one real-world feature to not occur during first time durations while the information is displayed on the display device, and wherein the controlling of the displaying of the information on the display device comprises controlling the displaying of the information on the display device during the first time durations to occur while the processing is not performed on the video frames to identify locations of at least one real-world feature and further controlling the ceasing of the displaying of the information on the display device during the second time durations to occur while the processing is being performed on the video frames to identify locations of at least one real-world feature.

\* \* \* \* \*

UNITED STATES PATENT AND TRADEMARK OFFICE
CERTIFICATE OF CORRECTION

PATENT NO. : 11,308,922 B2
APPLICATION NO. : 16/347943
DATED : April 19, 2022
INVENTOR(S) : Araújo et al.

It is certified that error appears in the above-identified patent and that said Letters Patent is hereby corrected as shown below:

In the Specification

In Column 1, Lines 51-52, delete "lens 100" and insert -- lens 110 --, therefor.

In Column 3, Line 5, delete "frequency which" and insert -- frequency at which --, therefor.

Signed and Sealed this
First Day of August, 2023

Katherine Kelly Vidal
*Director of the United States Patent and Trademark Office*